United States Patent [19]

Franks et al.

[11] Patent Number: 4,636,166
[45] Date of Patent: Jan. 13, 1987

[54] APPARATUS FOR APPLYING LABELS TO BLOW MOLDED ARTICLES

[75] Inventors: Nelson J. Franks, Toledo; Casimir W. Nowicki, Sylvania, both of Ohio

[73] Assignee: Owens-Illinois, Inc., Toledo, Ohio

[21] Appl. No.: 707,335

[22] Filed: Mar. 1, 1985

[51] Int. Cl.$^4$ ............................................. B65C 9/14
[52] U.S. Cl. ........................ 425/503; 156/DIG. 31; 264/509; 271/12; 425/504; 425/522
[58] Field of Search ................. 425/503, 504, 522; 264/509; 156/86, 538–540, DIG. 28, DIG. 29, DIG. 30, DIG. 31, DIG. 33; 271/12, 14, 99, 107

[56] References Cited

U.S. PATENT DOCUMENTS

| | | | |
|---|---|---|---|
| 3,292,209 | 12/1966 | Borkmann | 425/522 X |
| 3,324,508 | 6/1967 | Dickinson | 425/522 X |
| 3,341,390 | 9/1967 | Kirk | 156/DIG. 33 |
| 3,779,829 | 12/1973 | Wolff | 156/DIG. 33 |
| 3,887,177 | 6/1975 | Farfaglia et al. | 271/12 |
| 3,989,583 | 11/1976 | Watson | 156/DIG. 29 |
| 4,025,382 | 5/1977 | Del Rosso | 156/DIG. 31 |
| 4,065,118 | 12/1977 | Dudley | 271/14 |
| 4,148,473 | 4/1979 | Johnson | 271/12 X |
| 4,357,007 | 11/1982 | Franciscus et al. | 271/12 X |
| 4,359,314 | 11/1982 | Hellmer | 425/522 X |
| 4,397,625 | 8/1983 | Hellmer et al. | 425/145 X |
| 4,425,181 | 1/1984 | Bahr et al. | 156/DIG. 31 |
| 4,479,770 | 10/1984 | Slat et al. | 425/504 X |
| 4,501,548 | 2/1985 | Jahnel | 425/522 X |
| 4,505,467 | 3/1985 | Brocklehurst | 156/DIG. 31 |
| 4,561,921 | 12/1985 | Treiber | 271/107 X |

FOREIGN PATENT DOCUMENTS

724989 2/1955 United Kingdom ....... 156/DIG. 28

Primary Examiner—Richard L. Chiesa
Attorney, Agent, or Firm—Philip M. Rice

[57] ABSTRACT

In the making of hollow plastic articles wherein a label is positioned in each of a plurality of spaced partible molds, a preform is positioned in each set of partible molds and the molds are closed and the preform is blown outwardly into the confines of the mold to apply the label to the resultant hollow plastic articles, the method of handling the labels which comprises successively removing labels from a label magazine and positioning the labels in an array which corresponds in spacing to the spacing of the sets of molds, simultaneously moving said labels in the array from the first position to a second position within the open partible molds and depositing the labels in the molds. The apparatus comprises a magazine for supporting labels in a stack, an endless belt transfer device positioned adjacent the magazine, means for indexing the belt in predetermined spaces corresponding to the spaces of said molds, means for successively removing a label from the magazine and depositing it on the conveyor, the spacing between the labels on the endless transfer conveyor corresponding to the spacing between the sets of molds, and means for removing the labels simultaneously from said endless transfer conveyor and delivering them between the open partible molds.

16 Claims, 16 Drawing Figures

APPARATUS FOR APPLYING LABELS TO BLOW MOLDED ARTICLES

This invention relates to the application of labels to hollow blown plastic articles.

BACKGROUND AND SUMMARY OF THE INVENTION

In the making of hollow blown plastic articles such as containers, it has heretofore been suggested that labels be held in one or more of the mold sections by vacuum so that when the parison is blown outwardly into conformity with the cavity, the label becomes adhered or bonded to the article.

The molds are often provided in a plurality of sets of partible molds and in order to deliver the labels, a plurality of magazines are provided, one for each set of molds, and an associated plurality of pick up and delivery devices function to remove labels from the magazines and deliver them to one or both of the molds of each set.

Among the objectives of the present invention are to provide a method and apparatus for delivering labels which requires one magazine where one label is delivered to each set of molds and two magazines when two labels are delivered to each set of molds; wherein large labels that wrap around more than 180° about the hollow article such as a container can be used even though the relative dimensions and spacing of the molds is less than the width of the labels; and wherein fewer tools are required with the resultant savings in costs are obtained.

In accordance with the invention, labels are successively removed from a label magazine and positioning the labels in an array which corresponds in spacing to the spacing of the sets of molds. The labels are then simultaneously moved in the array from the first position to a second position within the open partible molds and deposited in the molds. The apparatus comprises a magazine for supporting labels in a stack, and an endless belt transfer device positioned adjacent the magazine. The belt is indexed in predetermined spaces corresponding to the spaces of the sets of molds. A label pick up device removes a label from the magazine and deposits it on the conveyor so that the spacing between the labels on the endless transfer conveyor corresponds to the spacing between the sets of molds. Another label deposit device removes the labels simultaneously from the endless transfer conveyor and delivers them between the open partible molds.

DESCRIPTION

Figure 1:
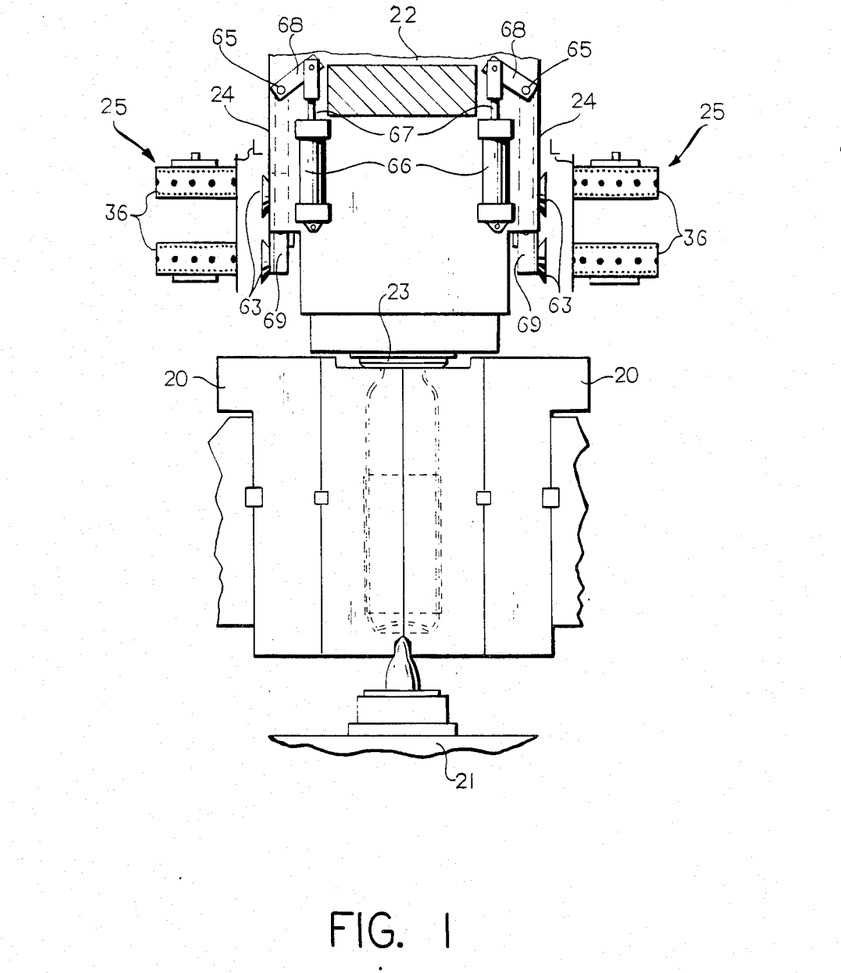
FIG. 1 is a fragmentary partly diagrammatic end view of an apparatus embodying the invention.
Figure 2:
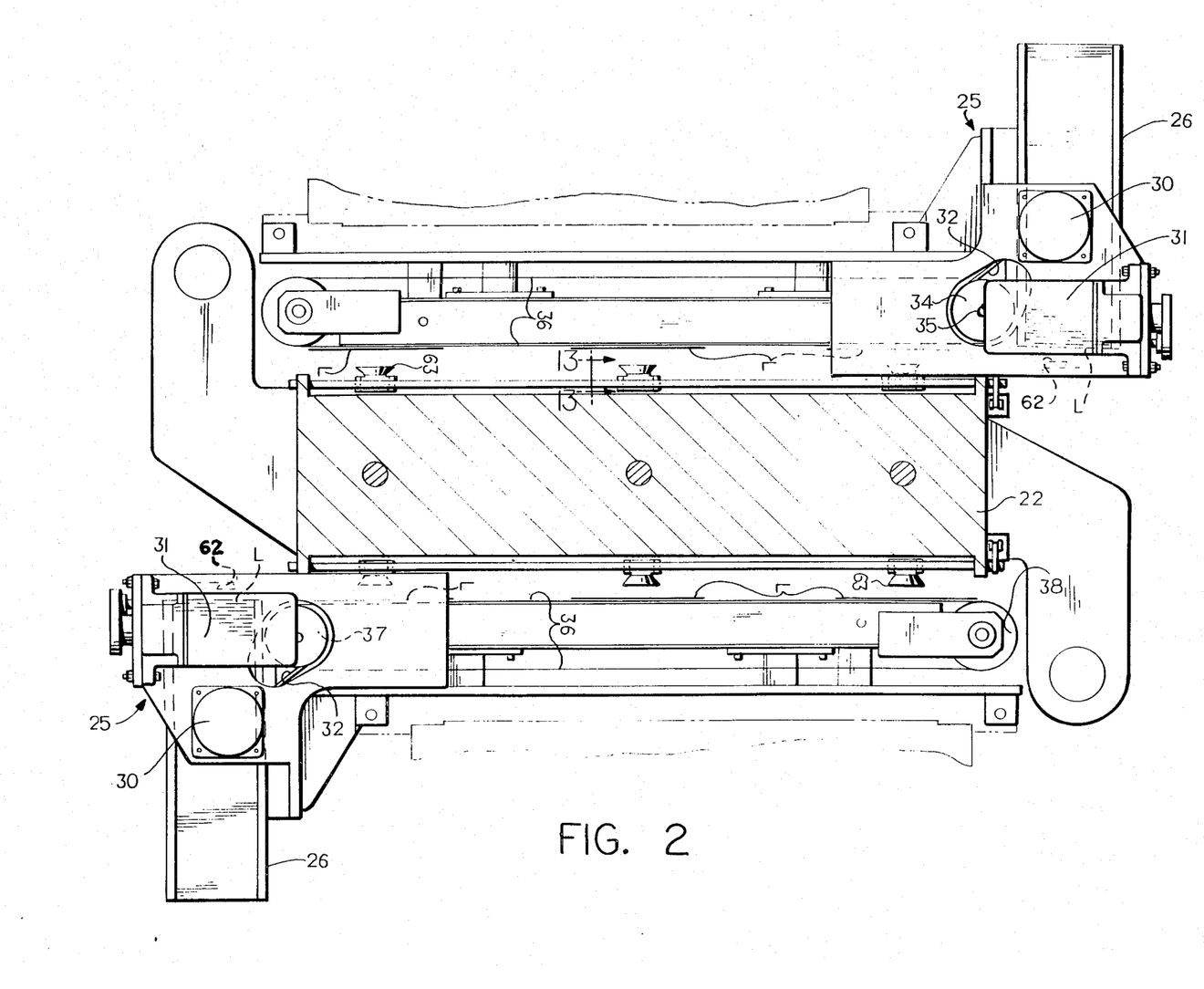
FIG. 2 is a fragmentary part sectional view of the apparatus shown in FIG. 1.

Referring to FIGS. 1 and 2, the invention relates to blow molded plastic articles such as containers wherein labels are applied to sections of a set of molds and the mold sections are closed and a heated parison or preform is blown outwardly into conformity with the mold sections causing the labels to be adhered or bonded to the blown articles.

In one type of apparatus to which the invention relates, the apparatus includes a plurality of sets of partible molds 20 in a linear array, that is, side-by-side relationship. An extruder 21 is associated with each set of molds and a head 22 is moved downwardly to receive the end of an extruded tube in a neck mold in the head which is then drawn upwardly to position a preform or parison between the mold sections 20. The mold is then closed and the article blown to the desired configuration within the confines of the mold. Where a label is to be applied, the head 22 supports label deposit devices 24 as hereinafter described which deliver labels to the mold sections. If only one label is to be applied, a single deposit device 24 is provided for each set of molds.

In accordance with the invention, a label handling mechanism 25 is associated with each set of label delivery devices 24. The label handling mechanisms 25 are of identical construction and as shown in FIG. 2 are positioned end to end where labels are to be delivered to both sections of each set of molds. For convenience and clarity only one of the mechanisms 25 will be described in detail, it being understood that the other device is identical.

Figure 4:
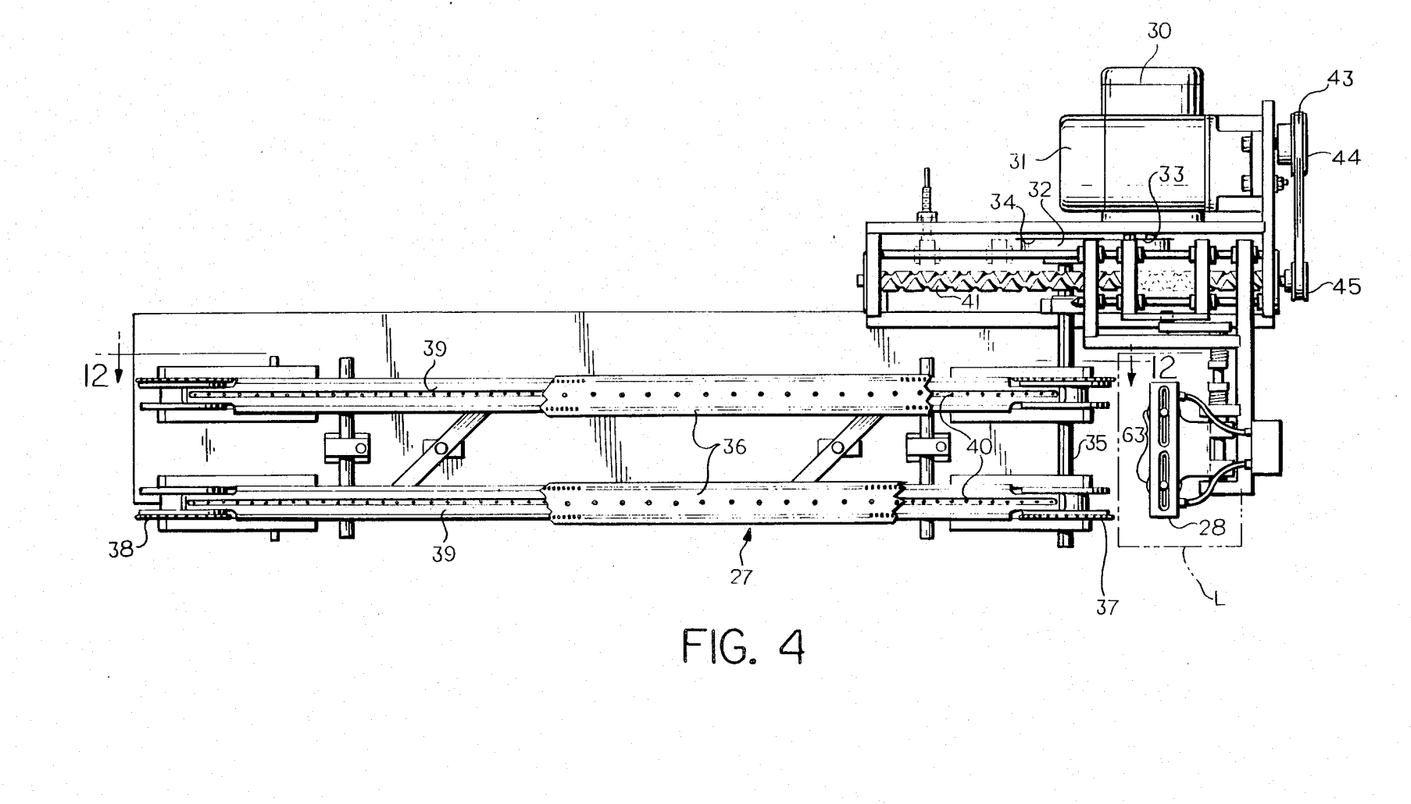
FIG. 4 is a fragmentary elevational view of the portion of the apparatus shown in FIG. 3.
Figure 5:
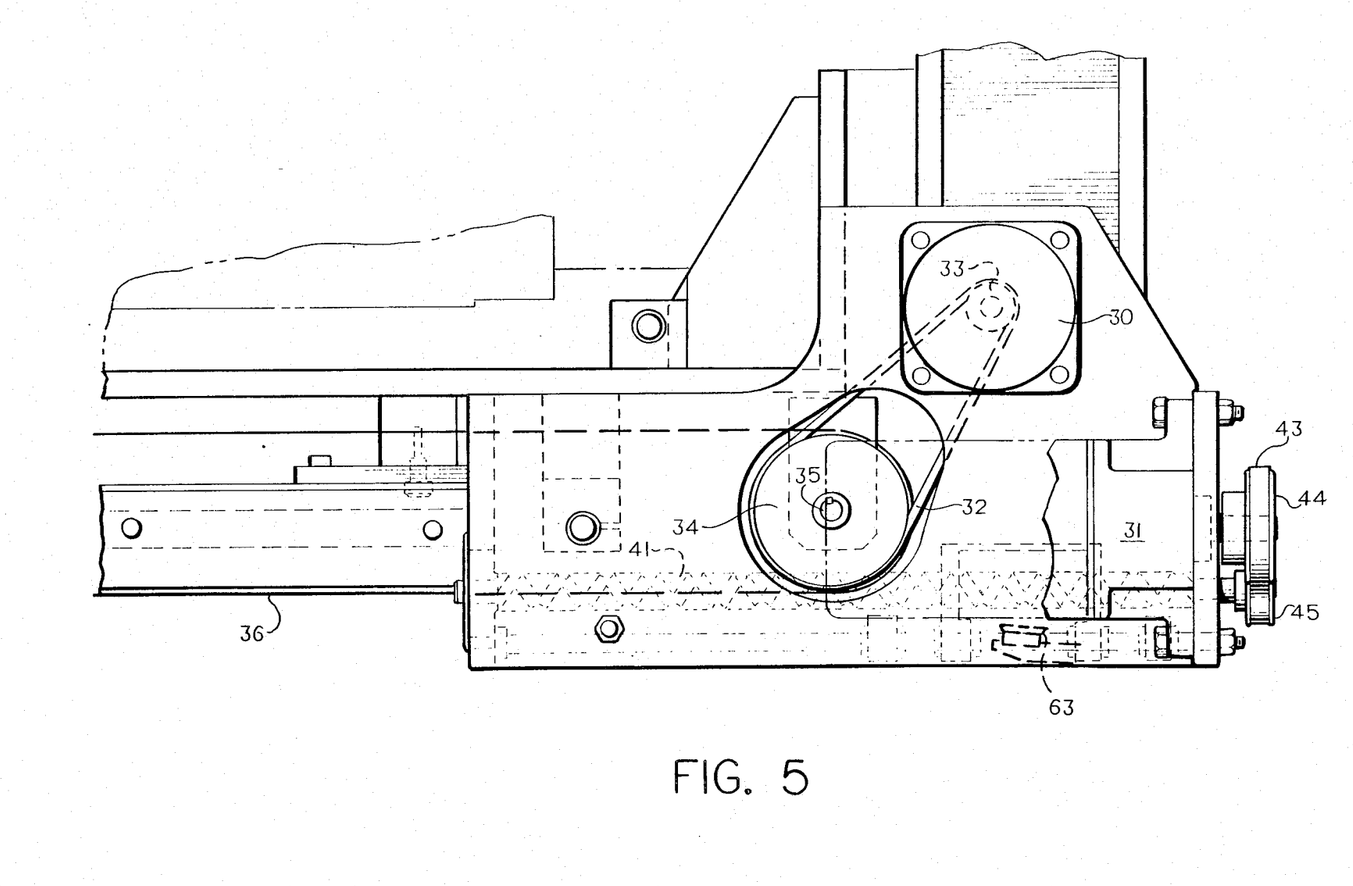
FIG. 5 is a fragmentary view on an enlarged scale of a portion of the apparatus shown in FIG. 3.
Figure 6:
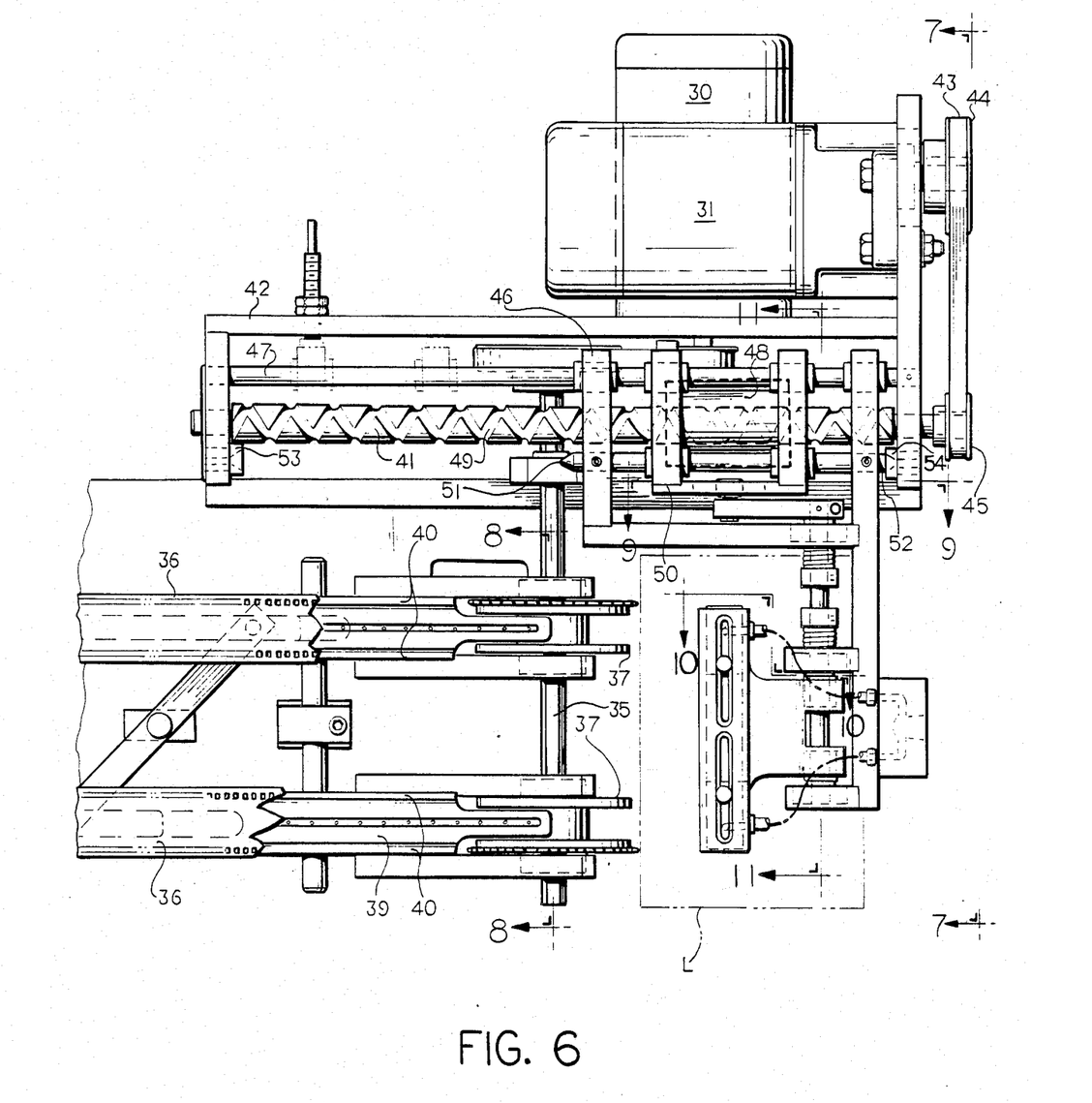
FIG. 6 is a fragmentary view on an enlarged scale of a portion of the apparatus shown in FIG. 4.
Figures 7, 8:
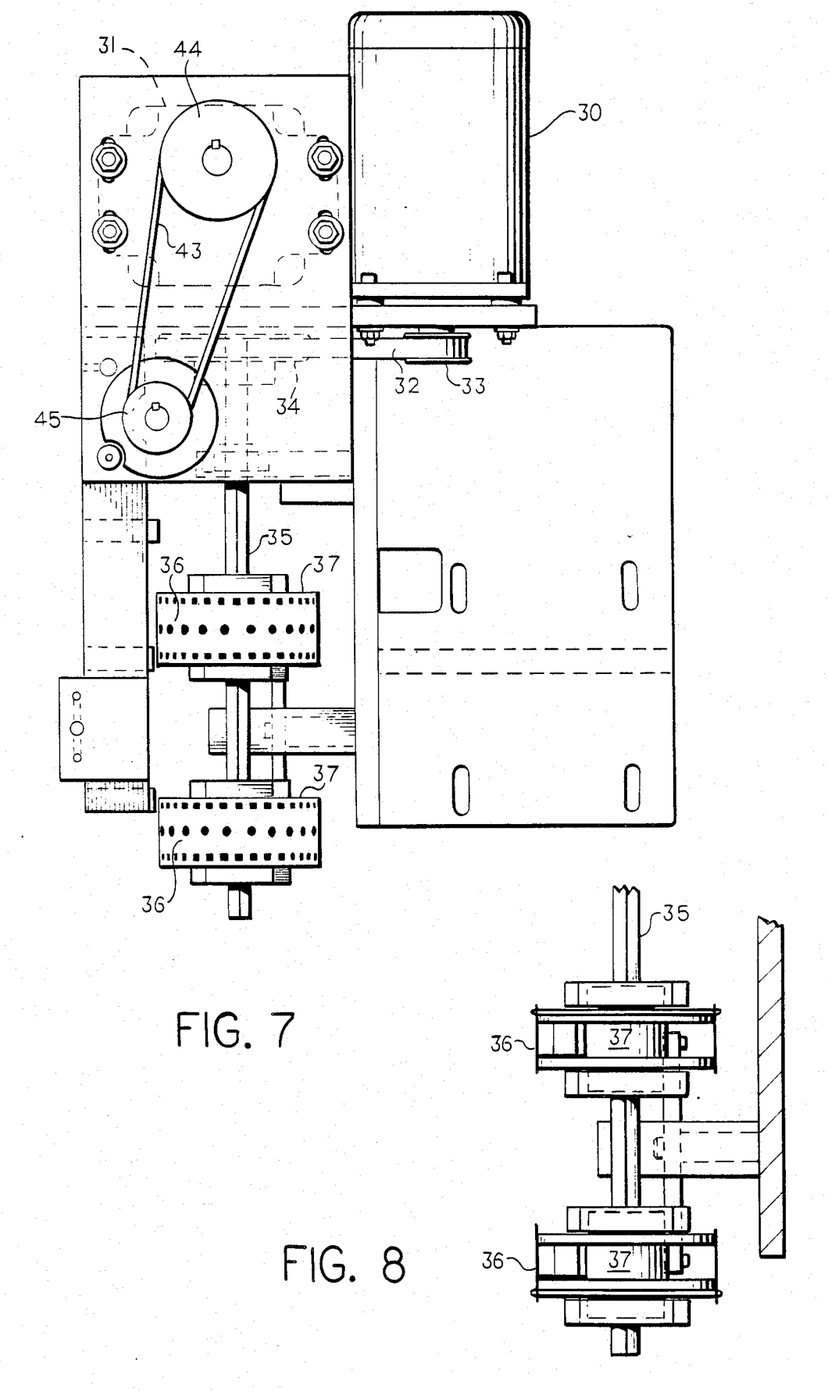
FIG. 7 is an end view of the apparatus shown in FIG. 6, parts being broken away.
FIG. 8 is a fragmentary sectional view taken along the line 8—8 in FIG. 6.
Figure 9:
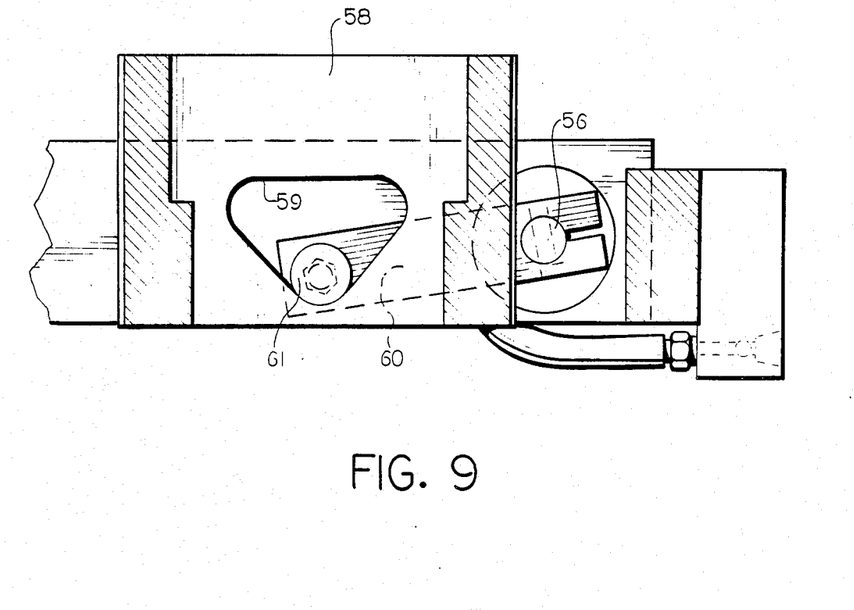
FIG. 9 is a fragmentay sectional view taken along the line 9—9 in FIG. 6.
Figure 10:
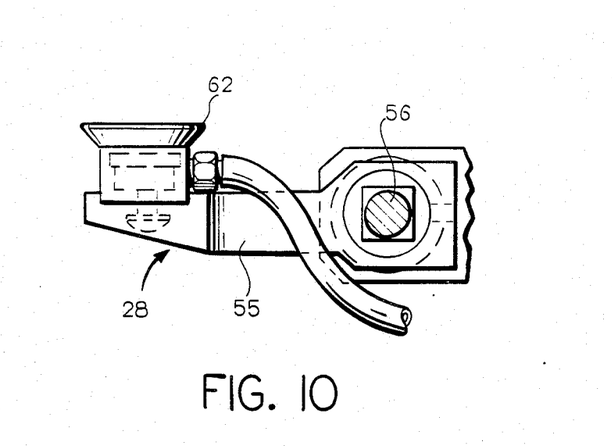
FIG. 10 is a fragmentary sectional view on an enlarged scale taken along the line 10—10 in FIG. 6.
Figure 11:
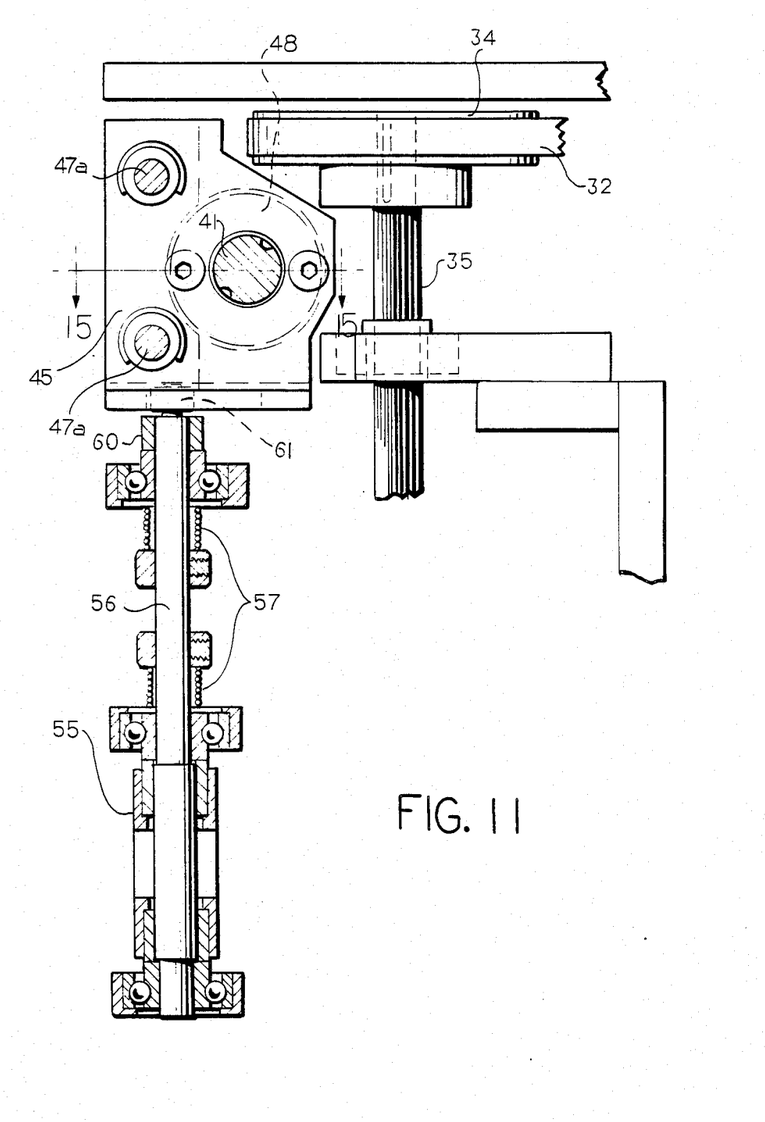
FIG. 11 is a fragmentary sectional view on an enlarged scale taken along the line 11—11 in FIG. 6.
Figure 12:
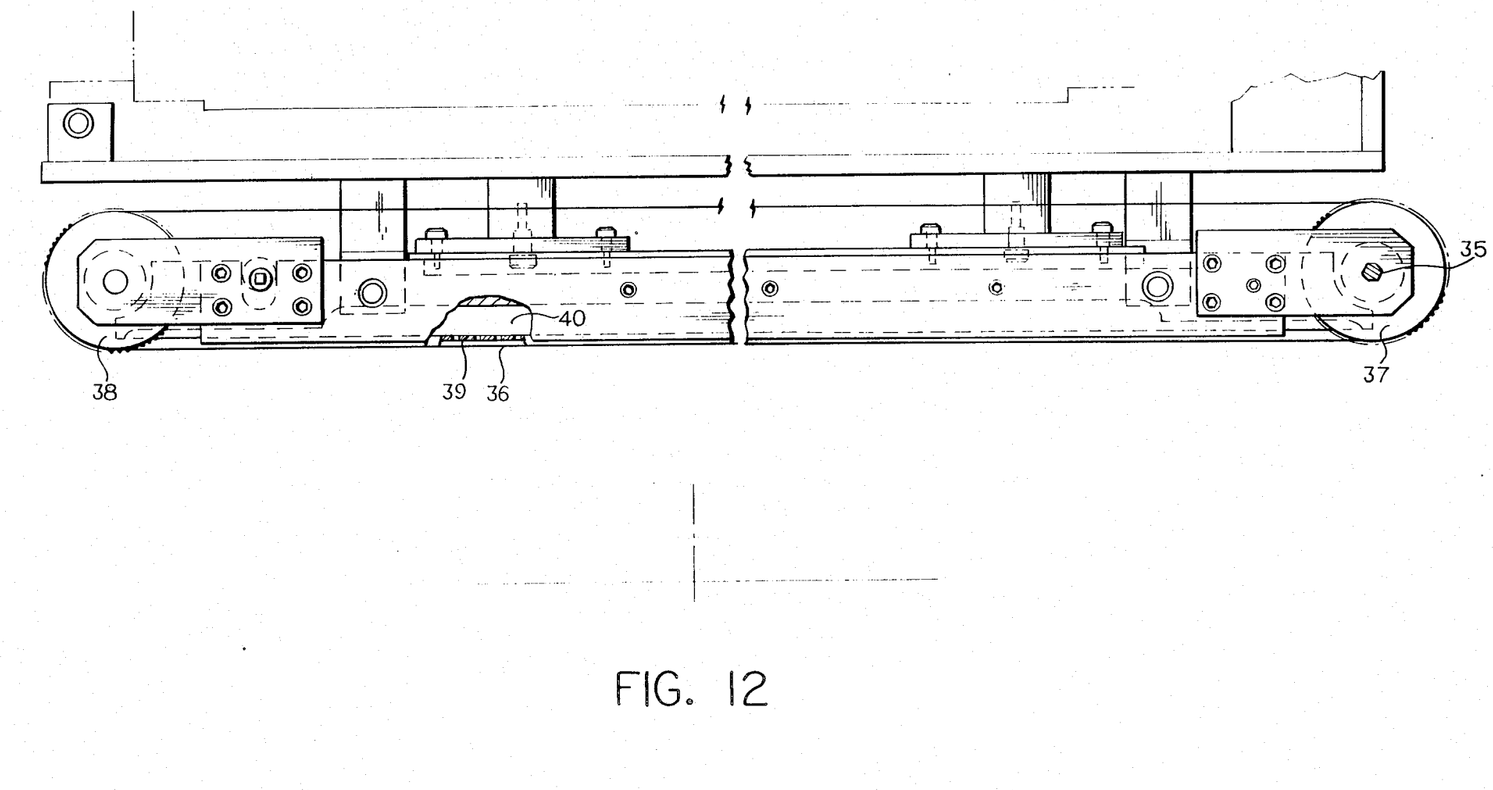
FIG. 12 is a fragmentary view on an enlarged scale taken along the line 12—12 in FIG. 4.

Referring to FIGS. 2, 4, each of the mechanisms 25 includes a magazine 26 from which labels are successively removed and delivered to an endless conveyor 27 by a label pick-up and delivery device 28. The endless conveyor 27 is intermittently driven so that as the labels are delivered to the endless conveyor, they are positioned in a linear array at a spacing corresponding to the spacing of the sets of molds. After the predetermined number of labels corresponding to the sets of molds is provided on the endless conveyor, the delivery device 24 removes the sets of labels simultaneously and the head 22 moves downwardly to deliver the labels to the mold sections. The head 22 then moves upwardly as viewed in FIG. 1 while the tube is extruded to form the preform within the open mold sections. When the head 22 reaches its uppermost position as viewed in FIG. 1, the delivery devices 24 can pick up the next array of labels which have in the meantime been positioned onto the endless conveyor by intermittent movement of the conveyor and the loading pick-up and delivery device 28.

Figure 3:
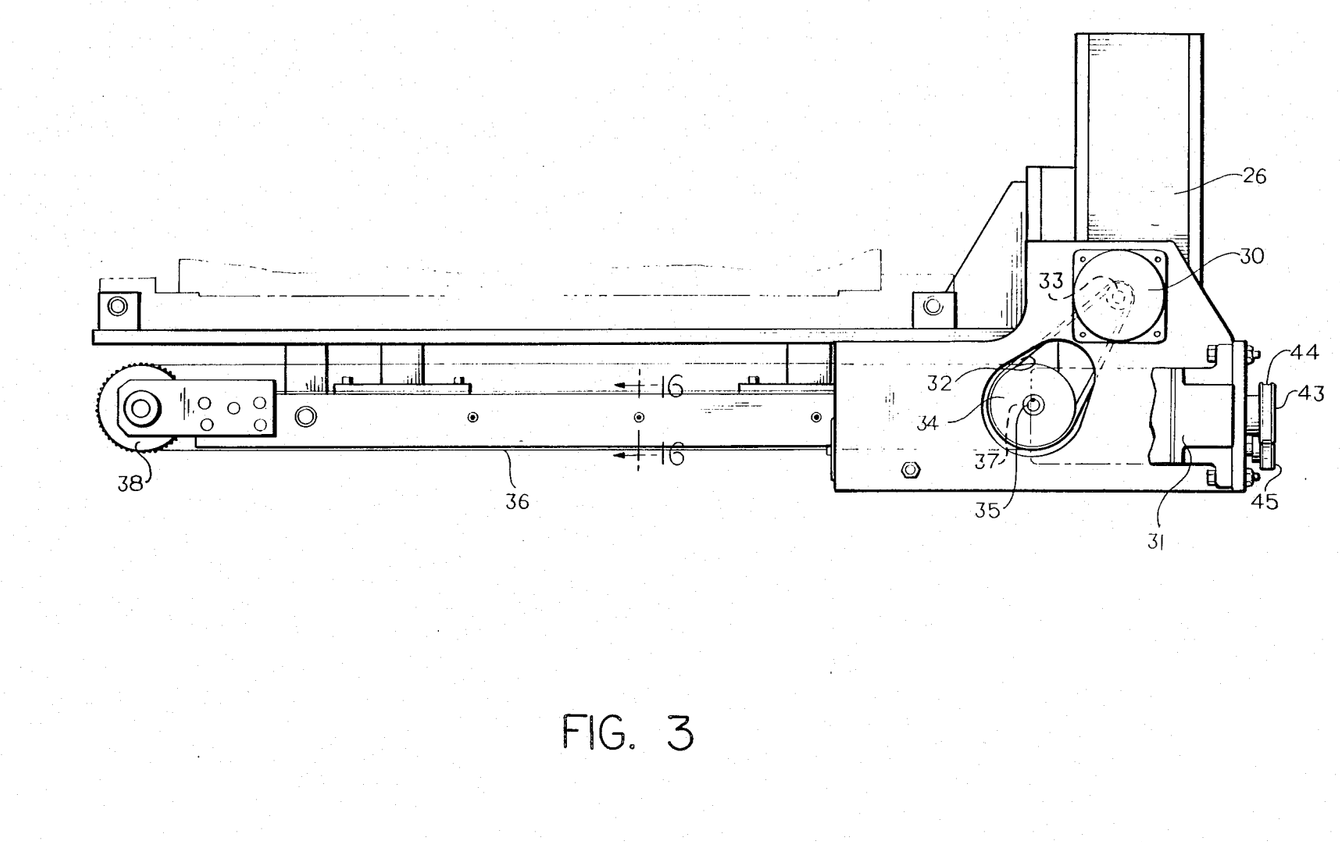
FIG. 3 is a fragmentary plan view of a portion of the apparatus.
Figure 16:
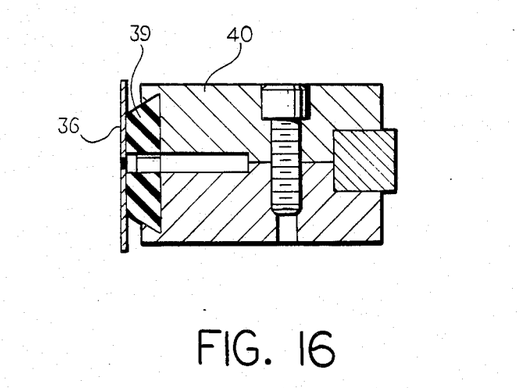
FIG. 16 is a fragmentary sectional view on an enlarged scale taken along the line 16—16 in FIG. 3.

Referring to FIG. 3, power for driving the various mechanisms of each label handling mechanism 25 is received from motors 30, 31 on the frame. Motor 30 comprises a stepping motor and drives through an endless belt 32 and pulleys 33, 34 to a driveshaft 35 that rotates spaced thin metal endless perforated belts 36, trained on sprockets 37, 38. (FIG. 2). Referring to FIG. 16, endless belts 36 move across a perforated resilient wall 39 of a vacuum chamber 40 thereby applying vacuum which will hold the labels when they are delivered. The endless belts 36 are moved intermittently and the labels are delivered to the conveyor so that they form an array of labels at a spacing corresponding to the array of the molds.

Motor 31 drives to a reversing screw 41 which is journalled in a frame 42, through an endless belt 43 and pulleys 44, 45. A carriage 46 is mounted in the frame 42 by spaced shafts 47 and has a follower 48 engaging the thread 49 of the screw 41 so that the carriage 46 is reciprocated back and forth as the screw 41 is rotated in one direction. A secondary carriage 50 is mounted on the first carriage 46 and guided similarly on shafts 47a. Projections 51, 52 extend from a secondary carriage 50 such that just before the first carriage 46 reaches the end of its movement, one or the other of the projections 51, 52 engages a recess 53, 54 at each end to cause relative movement between the second carriage 50 and the first carriage 46.

The pick-up and delivery device 28 includes an arm 55 mounted for swinging movement on a shaft 56 journalled on the frame and resiliently held in a center position by springs 57. The second carriage 50 supports an internal cam 58 which is generally triangular and has its hypotenuse, or longest dimension 59 generally parallel to the screw. A link 60 fixed on the shaft 56 of the pick-up and delivery device 28 has a follower 61 that engages the cam 58. As the first carriage 46 reaches the end of its movement, the secondary carriage 50 is moved relative to the first carriage 46 causing the link 60 to pivot and move the delivery and pick-up device 28 into engagement with the magazine. The pick-up and delivery device 28 is of the vacuum type and includes vacuum cups 62 for picking up a label from the magazine.

When the main carriage 46 moves in the opposite direction, the cam 58 on the secondary carriage 50 moves the delivery and pick-up device 28 away from the magazine to its original position. As the main carriage 46 moves toward its opposite end of movement, the secondary carriage 50 is moved relative to the first carriage 46 and causes the cam 58 and cam follower 61 to swing the pick-up and delivery device 28 and bring the label on the vacuum cups 62 into engagement with the endless conveyor belts 36 depositing the label on the endless conveyor belts.

Figure 13:
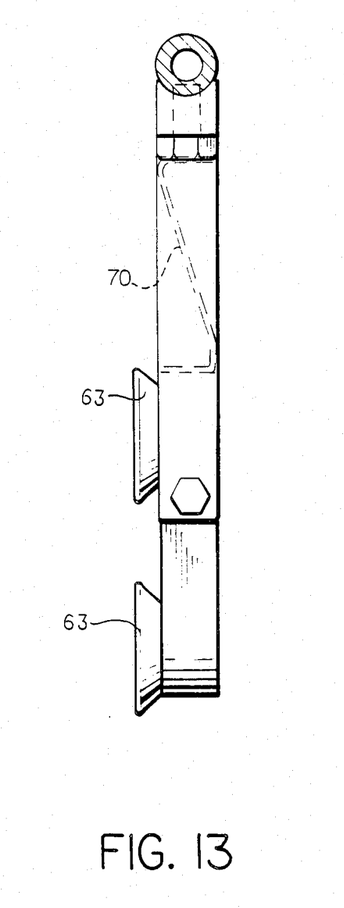
FIG. 13 is a fragmentary view taken along the line 13—13 in FIG. 2.
Figure 14:
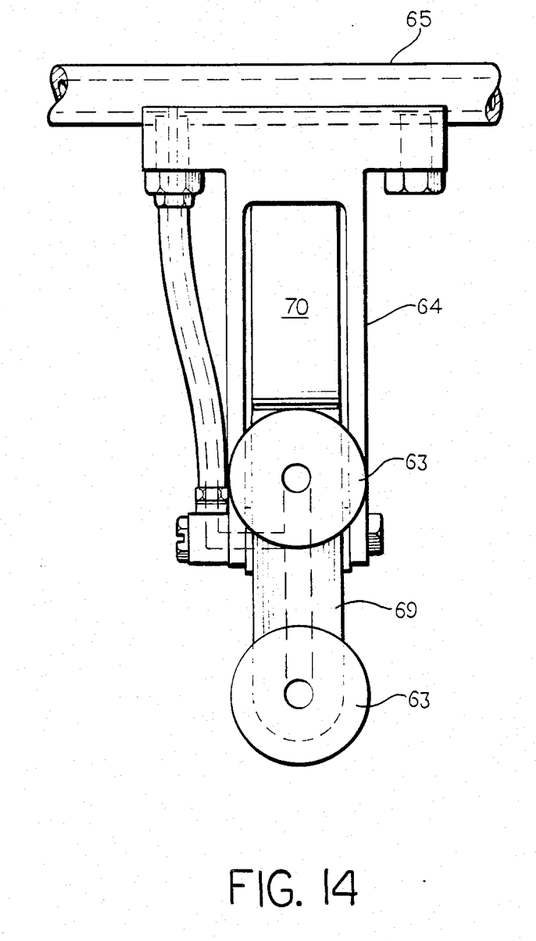
FIG. 14 is an elevational view of a portion of the apparatus shown in FIG. 13.
Figure 15:
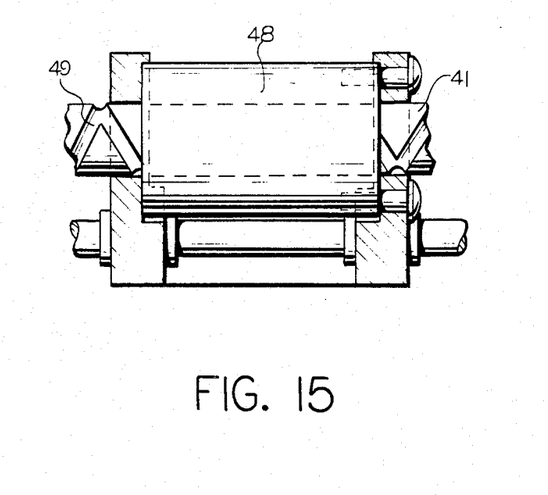
FIG. 15 is a fragmentary sectional view taken along the line 15—15 in FIG. 11.

Referring to FIGS. 13 and 14, the deposit devices 24 which remove the label from the conveyor comprises spaced vacuum cups 63 mounted on the arm 64 on a shaft 65 pivoted on the head 22. Referring to FIG. 1, cylinder 66 mounted on the head 22 has its shaft 67 connected by a link 68 to shaft 65 on which the plurality of sets of deposit arms 64 are mounted and functions to move each pair of cups 63 simultaneously to engage all the labels on the conveyor simultaneously. Retraction of the arms 64 removes the labels so that when the head 22 is moved downwardly between the mold sections, actuation of the cylinder 66 of each set of arms will move the arms outwardly and deposit all of the labels simultaneously in the respective mold sections of the sets of molds. In order to permit the vacuum cups to readily engage the labels on the conveyor, each arm 64 includes a secondary arm 69 pivoted on arm 64 and centered by a spring 70 thereby permitting limited movement of secondary arm 69 and in turn the cups 63 relative to the arm 64.

We claim:

1. In combination with an apparatus for forming hollow plastic articles wherein parisons are blown outwardly into conformity with the cavities of an array of sets of partible mold sections which open and close and are in a predetermined array, an apparatus for handling labels which comprises
    a magazine for supporting labels in a stack,
    an endless belt transfer conveyor positioned adjacent said magazine,
    means for indexing said belt in predetermined distances corresponding to the spaces between the sets of said mold sections of said array of said sets of mold sections,
    means for successively removing a label from the magazine and depositing it on the conveyor, such that the labels are arranged in a predetermined array of spaced labels with the spacing between the labels on the endless transfer conveyor corresponding to the spaces between the sets of mold sections, and
    means for removing the array of labels simultaneously from said endless transfer conveyor and delivering them between the array of open partible mold sections.

2. The apparatus set forth in claim 1 wherein said means for removing and simultaneously delivering said labels comprises a plurality of label delivery devices corresponding in number to the number of sets of mold sections and positioned at a spacing corresponding to the spacing between the labels in the array on the endless transfer conveyor,
    means for moving said label delivery devices from a position adjacent said conveyor to a position within an array of the sets of open partible mold sections,
    said delivery devices having means for removing said labels from said conveyor means and means for depositing said labels within said mold sections.

3. The apparatus set forth in claim 2 wherein said last named means comprises vacuum devices.

4. The apparatus set forth in claim 3 wherein said vacuum devices are mounted on a head which functions to draw the parison from an extruder.

5. The apparatus set forth in claim 1 wherein said means for removing said labels successively from a magazine comprises a pick-up and delivery device,
    means for moving said pick-up and delivery device adjacent the magazine for picking up a label,
    and means for translating said pick-up and delivery device to deposit said labels consecutively onto said conveyor as the conveyor is indexed.

6. The apparatus set forth in claim 5 wherein said means for translating said pick-up and delivery device comprises a carriage,
    means for guiding said carriage in movement in a linear path parallel to the conveyor, and an endless reversible screw parallel to the conveyor operable to move said carriage back and forth in said linear path, said pick up and delivery device being mounted for pivotal movement on said carriage, interengaging means between said pick-up and delivery device and said carriage operable upon movement of the carriage to the extremes of its linear movement wuch that the pick-up and delivery device is moved at one end of said linear movement into engagement with the magazine for picking up a label and upon return movement is moved out of engagement with a magazine and upon returning to the other end of the linear movement in the opposite direction is moved bringing the label into engagement with the endless conveyor means.

7. The apparatus set forth in claim 6 wherein said pick-up and delivery device is of the vacuum type.

8. The apparatus set forth in claim 7 wherein said endless conveyor is of the vacuum type for holding the labels.

9. The apparatus set forth in claim 6 wherein said interengaging means comprises a secondary carriage mounted on said first mentioned carriage, said secondary carriage being connected to said pick-up and delivery device and movable relative to said first carriage.

10. The apparatus set forth in claim 9 wherein said interengaging means comprises a cam on said secondary carriage and a cam follower on said pick-up device.

11. The apparatus set forth in claim 10 wherein said cam comprises an internal cam which is generally triangular in configuration having its base extending generally parallel to the direction of translation of said second carriage, said pick-up device having a link with a cam follower engaging said cam.

12. The apparatus set forth in anyone of claims 1–19 including a second substantially indentical label handling apparatus positioned adjacent a second magazine for removing labels successively from the second magazine, moving them into a linear array on a second conveyor means, and transferring them from the second conveyor means to the opposite partible mold section of said array of said sets of mold sections such that two labels are delivered to each set of mold sections in the predetermined array simultaneously.

13. In combination with an apparatus for forming hollow plastic articles wherein parisons are blown outwardly into conformity with the cavities of an array of sets of parible mold sections which open and close and are in a predetermined array, an apparatus for handling labels which comprises, a magazine for supporting labels in a stack, an endless belt transfer conveyor of the vacuum typo positioned adjacent said magazine, means for indexing said belt in predetermined distances corresponding to the spaces between the sets of said mold sections of said array of said sets of mold sections, means for successively removing a label from the magazine and depositing it on the conveyor, such that the labels are arranged in a predetermined array of spaced labels with the spacing between the labels on the endless transfer conveyor corresponding to the spaces between the sets of mold sections comprising a pick-up and delivery device, means for moving said pick-up and delivery device adjacent the magazine for picking up a label, and means for translating said pick-up and delivery device to deposit said labels consecutively onto said conveyor as the conveyor is indexed comprising a carriage, means for removing and simultaneously delivering said labels comprising a plurality of label delivery devices corresponding in number to the number of sets of mold sections and positioned at a spacing corresponding to the spacing between the labels in the array on the endless transfer conveyor, vacuum devices for moving said label delivery devices from a position adjacent said conveyor to a position within an array of the sets of open partible mold sections, said delivery devices having means for removing said labels from said conveyor means and means for depositing said labels within said mold sections, means for guiding said carriage in movement in a linear path parallel to the conveyor, and an endless reversible screw parallel to the conveyor operable to move said carriage back and forth in said linear path, said pick-up and delivery device being mounted for pivotal movement on saied carriage, interengaging means between said pick-up and delivery device and said carriage operable upon movement of the carriage to the extremes of its linear movement such that the pick-up and delivery device is moved at one end of said linear movement into engagement with the magazine for picking up a label and upon return movement is moved out of engagement with a magazine and upon returning to the other end of the linear movement in the opposite direction is moved bringing the label into engagement with the endless conveyor means, said interengaging means comprising a secondary carriage mounted on said first mentioned carriage, said secondary carriage being connected to said pick-up and delivery device and movable relative to said first carriage, said interengaging means comprising a cam on said second carriage and a cam follower on said pick-up device.

14. The apparatus set forth in claim 13 wherein said vacuum devices are mounted on a head which functions to draw the parison from an extruder.

15. The apparatus set forth in claim 13 wherein said cam comprises an internal cam which is generally triangular in configuration having its base extending generally parallel to the direction of translation of said second carriage, said pick-up device having a link with a cam follower engaging said cam.

16. The apparatus set forth in any one of claims 13–15 including a second substantially identical label handling apparatus positioned adjacent a second magazine for removing labels successively from the second magazine, moving them into a linear array on a second conveyor means, and transferring them from the second conveyor means to the opposite section of said array of said sets of mold sections such that two labels are delivered to each set of mold sections in the predetermined array simultaneously.

* * * * *